(12) United States Patent
Wood

(10) Patent No.: US 7,798,444 B2
(45) Date of Patent: Sep. 21, 2010

(54) LANDING GEAR SYSTEM AND LOAD DISTRIBUTION

(75) Inventor: Jeffrey H. Wood, Eureka, MO (US)

(73) Assignee: The Boeing Company, Chicago, IL (US)

( * ) Notice: Subject to any disclaimer, the term of this patent is extended or adjusted under 35 U.S.C. 154(b) by 465 days.

(21) Appl. No.: 11/860,456

(22) Filed: Sep. 24, 2007

(65) Prior Publication Data

US 2009/0078822 A1    Mar. 26, 2009

(51) Int. Cl.
*B64C 25/10*    (2006.01)
(52) U.S. Cl. .............................. 244/102 A; 244/117 R; 244/102 R
(58) Field of Classification Search ............. 244/100 R, 244/102 R, 104 FP, 117 R, 119, 120, 50, 244/129.1, 129.4, 102 A
See application file for complete search history.

(56) References Cited

U.S. PATENT DOCUMENTS

| 4,345,727 | A | | 8/1982 | Brown et al. |
| 4,392,622 | A | | 7/1983 | McClaflin |
| 4,674,712 | A | * | 6/1987 | Whitener et al. ............. 244/119 |
| 5,435,504 | A | * | 7/1995 | Inoue et al. .................... 244/13 |
| 6,213,428 | B1 | * | 4/2001 | Chaumel et al. ............. 244/119 |
| 6,273,364 | B1 | | 8/2001 | Tizac et al. |
| 6,679,452 | B1 | | 1/2004 | Cottet et al. |
| 6,817,571 | B2 | * | 11/2004 | Retz et al. ...................... 244/15 |
| 2007/0210211 | A1 | * | 9/2007 | Grob .......................... 244/119 |

\* cited by examiner

*Primary Examiner*—Timothy D Collins
*Assistant Examiner*—Justin Benedik
(74) *Attorney, Agent, or Firm*—Klintworth & Rozenblat IP LLC

(57) ABSTRACT

In one embodiment, an aircraft comprises a plurality of hoop frame support members and a landing gear enclosure comprising a curved surface. The plurality of hoop frame support members abut against and extend over the curved surface to provide support to the landing gear enclosure. In another embodiment, loads are transferred from a landing gear strut through a strut fitting, through at least one inner surface of the landing gear enclosure, through at least one outer surface of the landing gear enclosure, and into the plurality of hoop frame support members.

28 Claims, 6 Drawing Sheets

LANDING GEAR SYSTEM AND LOAD DISTRIBUTION

BACKGROUND

Existing aircraft fuselages are typically aluminum and employ built-up structures that rivet thin gauge aluminum skins to aluminum substructure such as frames, stringers, and longerons. The nose landing gear enclosures of these aircraft typically comprise rectangular aluminum wheel well enclosures with flat sides at which hoop frames around the fuselage barrel terminate. These landing gear enclosures often carry both pressure and landing gear loads which are distributed into the aircraft fuselage. As a result, these enclosures may need to be robustly stiffened with stiffening members to carry the loads through the enclosures into the fuselage. This may result in increased part counts, increased weight, increased complexity, and increased cost, it may also lead to one or more other types of problems. Moreover, these types of enclosures may not be applicable to composite aircraft.

A landing gear enclosure system, and/or a method of use, installation, and/or load transfer in a landing gear enclosure, is needed to decrease one or more problems associated with one or more of the existing landing gear enclosures and/or methods of use, installation, and/or load transfer.

SUMMARY

In one aspect of the disclosure, an aircraft comprises a landing gear strut, a strut fitting attached to the landing gear strut abutting against at least one inner surface of a landing gear enclosure, and a plurality of hoop frame support members abutting against and extending over at least one outer surface of the landing gear enclosure. Loads from the landing gear strut transfer through the strut fitting, through the at least one inner surface of the landing gear enclosure, through the at least one outer surface of the landing gear enclosure, and into the plurality of hoop frame support members.

In another aspect of the disclosure, a method of transferring loads in as aircraft is provided. In one step, an aircraft is provided comprising a landing gear strut, a landing gear enclosure, and a plurality of hoop frame support members abutting against and extending over at feast one outer surface of the landing gear enclosure. In another step, loads are transferred from the landing gear strut, through the at least one outer surface of the landing gear enclosure, and into the plurality of hoop frame support members.

These and other features, aspects and advantages of the disclosure will become better understood with reference to the following drawings, description and claims.

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
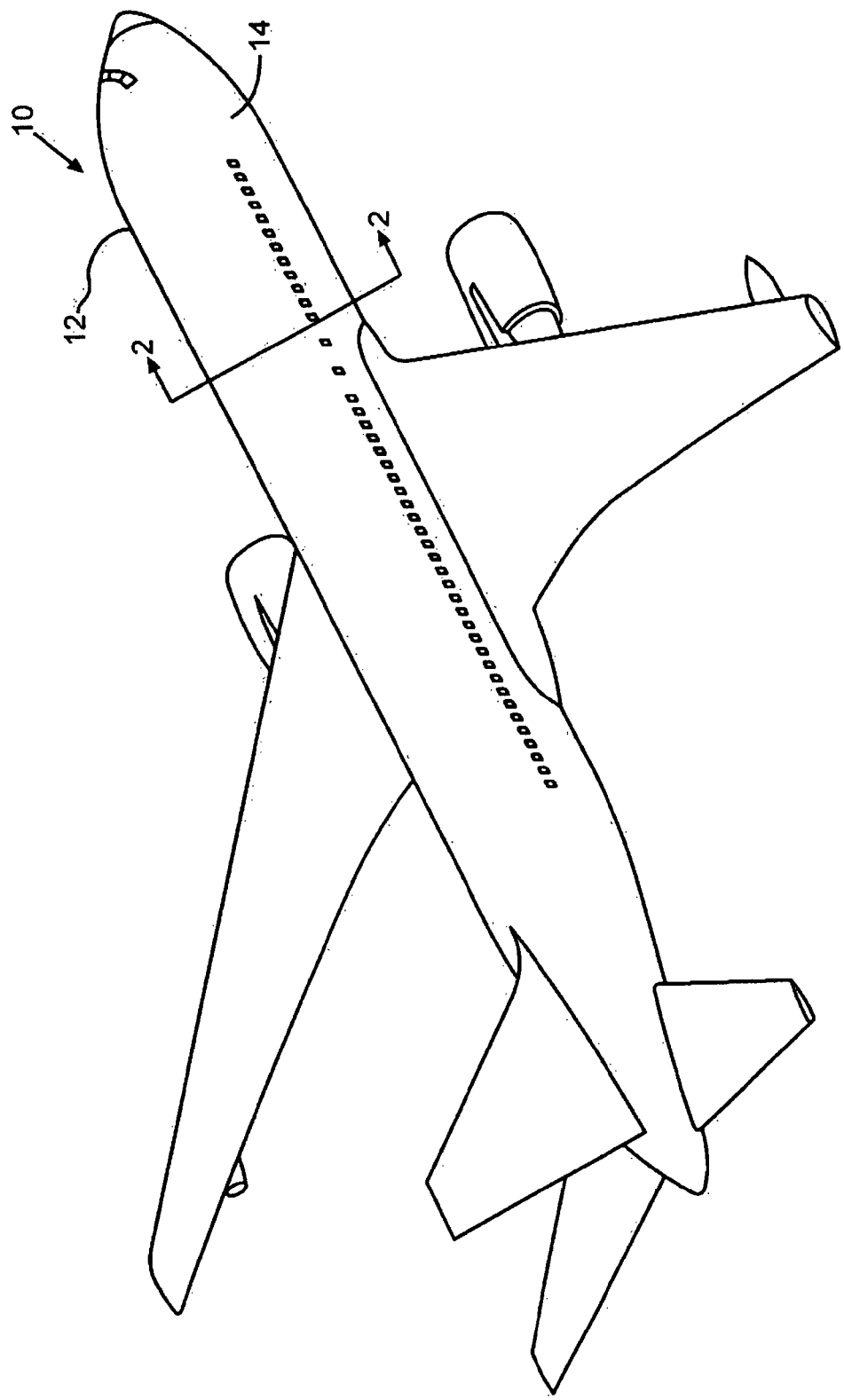
FIG. 1 shows a perspective view of one embodiment of an aircraft.
Figure 2:
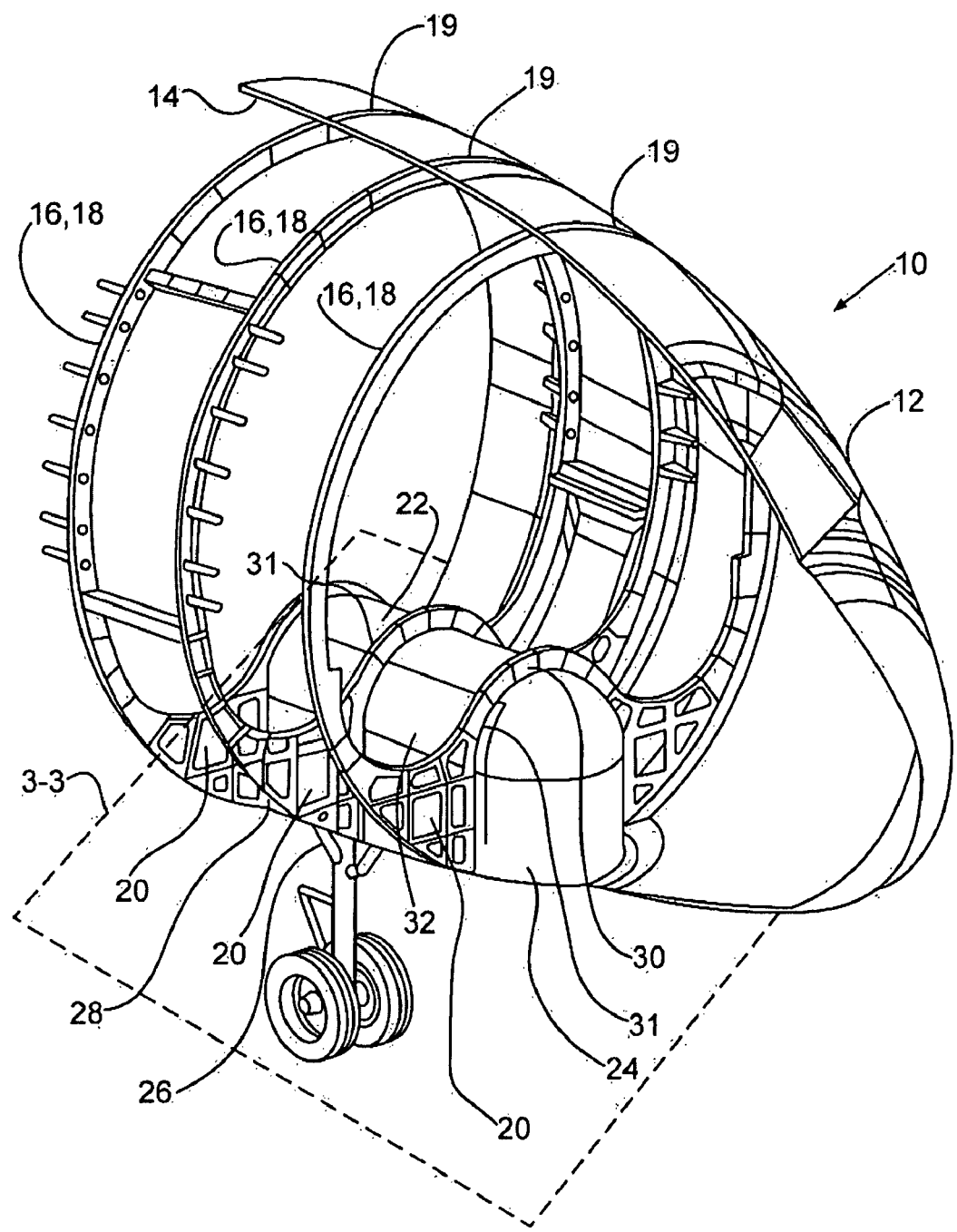
FIG. 2 shows a perspective partial cross-section view through line 2-2 of the embodiment of FIG. 1 with one side of the composite fuselage cut away.

FIG. 1 shows a perspective view of one embodiment of an aircraft 10. The aircraft 10 may have a composite fuselage 12. FIG. 2 shows a perspective partial cross-section view through line 2-2 of the embodiment of FIG. 1 with one side 14 of the composite fuselage 12 cutaway. As shown, a plurality of hoop frame support members 16 may be disposed in parallel, spaced apart formation within the composite fuselage 12. The hoop frame support members 16 may each form continuous loops 18 around the composite fuselage 12 which are adapted to carry all of the fuselage loads of the aircraft 10. Each hoop frame support member 16 may be attached to the fuselage 12 utilizing bolts 19, or other attachment mechanisms. The hoop frame support members 16 may be made of Titanium or Aluminum and may each be defined by a plurality of openings 20 through which aircraft components such as electrical lines, plumbing lines, etc. may be run.

The hoop frame support members 16 may extend over, around, and abut against a top curved surface 22 of a landing gear enclosure 24 in a saddle shaped manner in order to carry all fuselage loads of the aircraft 10 independently from the landing gear enclosure 24. The landing gear enclosure 24 may be made of a metal, a composite, or other material. In the embodiment shown, three hoop frame support members 16 abut against, around, and extend over the landing gear enclosure 24. In other embodiments, a varying number of hoop frame support members 16 may be utilized. The landing gear enclosure 24 may be dome-shaped and have the appearance of a dog-house comprising the top curved surface 22 and substantially straight side-surfaces 26. Substantially straight side-portions 28 of each hoop frame support member 16 may be aligned along and abut against the substantially straight side-surfaces 26 of the landing gear enclosure 24. The hoop frame support members 16 may be attached to the curved top surface 22 and/or the substantially straight side-surfaces 26 of the landing gear enclosure 24 utilizing bolts 30, or other attachment mechanisms. In such manner, the plurality of hoop frame support members 16 may provide support to the landing gear enclosure 24. In other embodiments, the landing gear enclosure 24 and the hoop frame support members 16 may be in a variety of materials, shapes, sizes, orientations, and configurations.

Figure 3:
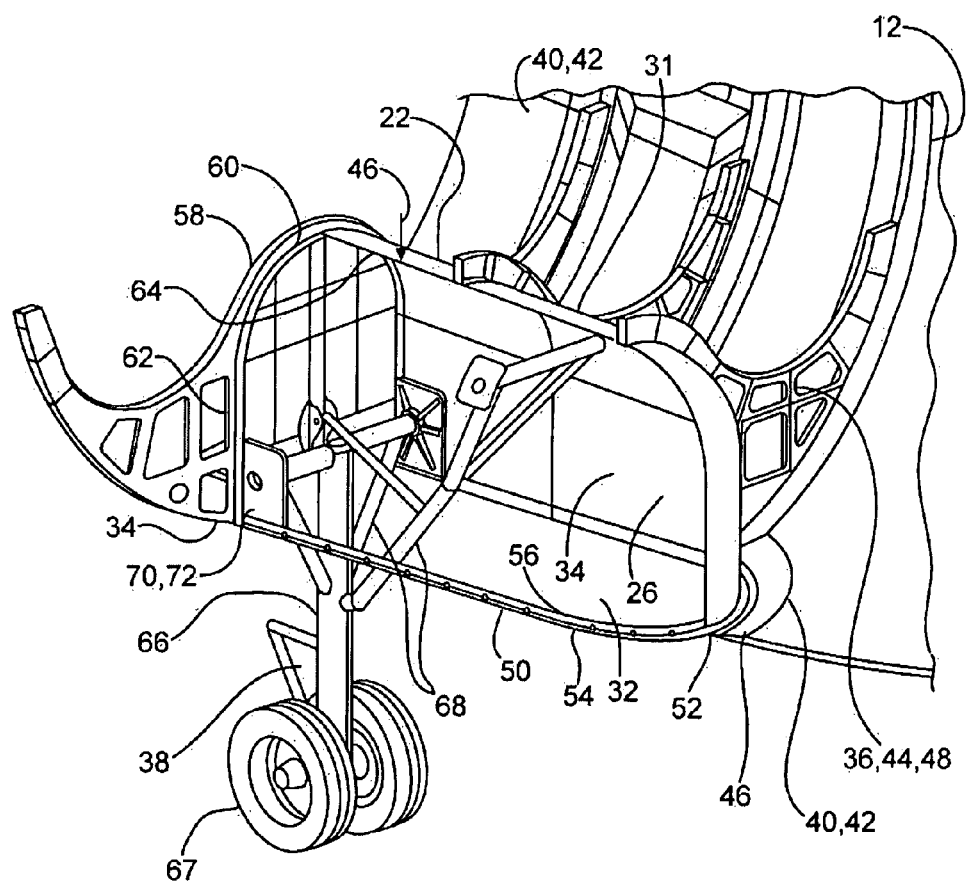
FIG. 3 shows a perspective, partial, close-up view within rectangle 3-3 of the embodiment of FIG. 2 with one side of the landing gear enclosure cut away and one side of some of the hoop frame support members cut away.

FIG. 3 shows a perspective, partial, close-up view within rectangle 3-3 of FIG. 2 with one side 32 of the landing gear enclosure 24 cut away and one side 31 of some of the hoop frame support members 16 cut away. As shown, the landing gear enclosure 24 may comprise an outer surface 33 and an inner surface 34 which defines a cavity 36 housing landing gear 38. The outer area 40 outside the outer surface 33 of the cavity 36 and inside the aircraft fuselage 12 may be pressurized to a higher pressure 42 than the un-pressurized pressure 44 within the inner surface 34 of the cavity 36 of the landing gear enclosure 24. In such manner, the curved surface 22 and substantially straight side surfaces 26 of the landing gear enclosure 24 may have a pressure differential 46 across them.

The pressure differential 46 may be pushing the curved surface 22 and the substantially straight side surfaces 26 of the landing gear enclosure 24 towards the inner portion 48 of the cavity 36. A curved, angled fitting 50 which is attached to the fuselage 12 may extend around a bottom peripheral edge 52 of the landing gear enclosure 24. The fitting 50 may have a horizontal base portion 54 and a vertical leg portion 56. The pressure differential 46 may compress the inner surface 34 of the bottom peripheral edge 52 of the landing gear enclosure 24 against the vertical leg portion 56 of the fitting 50 to prevent the landing gear enclosure 24 from collapsing due to the pressure differential 46.

The aft hoop, frame support member 58 may include a vertical, curved wall 60 which contains a protruding ledge 62. The pressure differential 46 may compress the inner surface 34 of the side peripheral edge 64 of the landing gear enclosure 24 against the protruding ledge 62 to further prevent the landing gear enclosure 24 from collapsing due to the pressure differential 46.

The landing gear 38 may be adapted to extend out of and retract into the cavity 36 of the landing gear enclosure 24. The landing gear 38 may comprise a landing gear strut 66 attached to one or more wheel axels 67. The landing gear strut may comprise a plurality of arm members 68. Strut fittings 70 may be attached to separate arm members 68 of the landing gear strut 66. The strut fittings 70 may each comprise a substantially straight surface 72. The substantially straight surface 72 of the strut fittings 70 may abut against the inner surface 34 of the cavity 36 of the landing gear enclosure 24.

Figure 4:
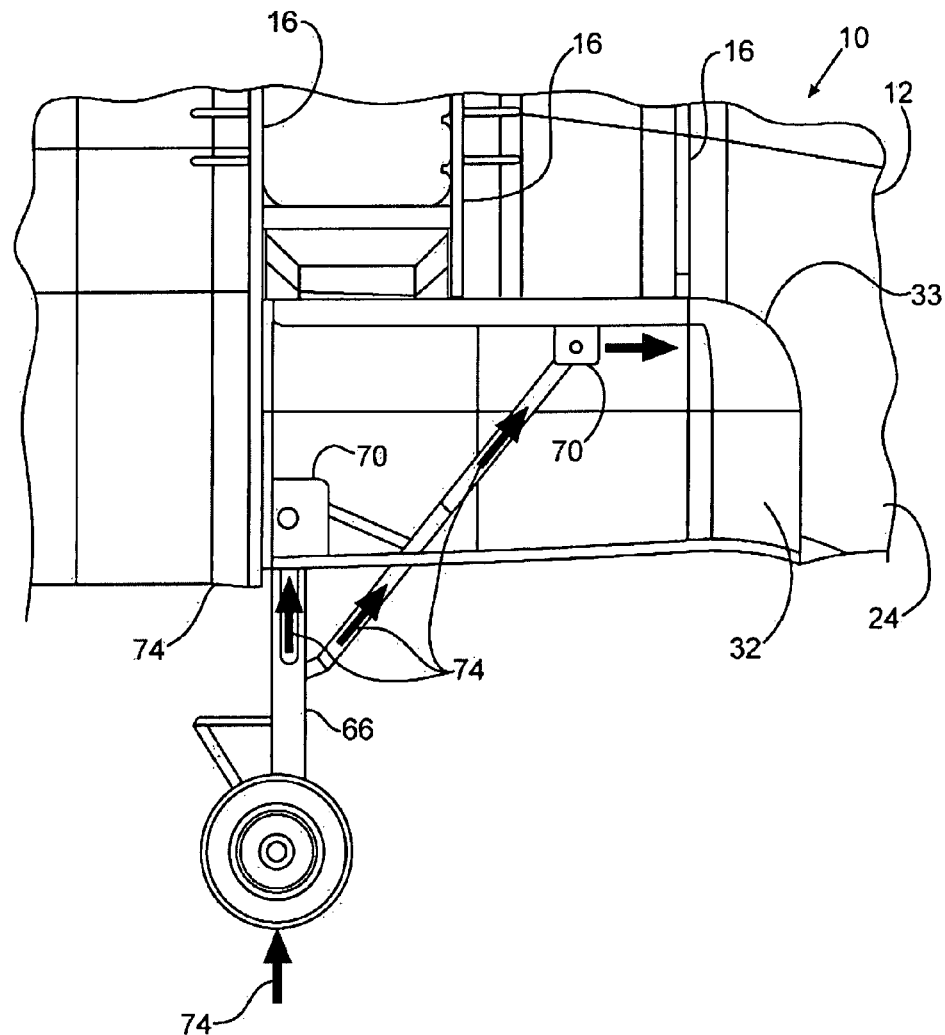
FIG. 4 shows a partial side-view of the embodiment of FIG. 3 showing the load distribution from the landing gear strut through the landing gear enclosure and into the fuselage.

FIG. 4 shows a partial side-view of the embodiment of FIG. 3 showing the load distribution from the landing gear strut 66 through the enclosure 24 and into the fuselage 12. As shown in FIG. 4, loads 74 from the landing gear strut 66 may transfer through the strut fittings 70, through the inner surface 32 of the landing gear enclosure 24, through the outer surface 33 of the landing gear enclosure 24, into the plurality of hoop frame support members 16, and into the fuselage 12 of the aircraft 10. In such manner, the loads 74 from the landing gear strut 66 may be transferred into the fuselage 12 without collapsing the landing gear enclosure 24.

Figure 5:
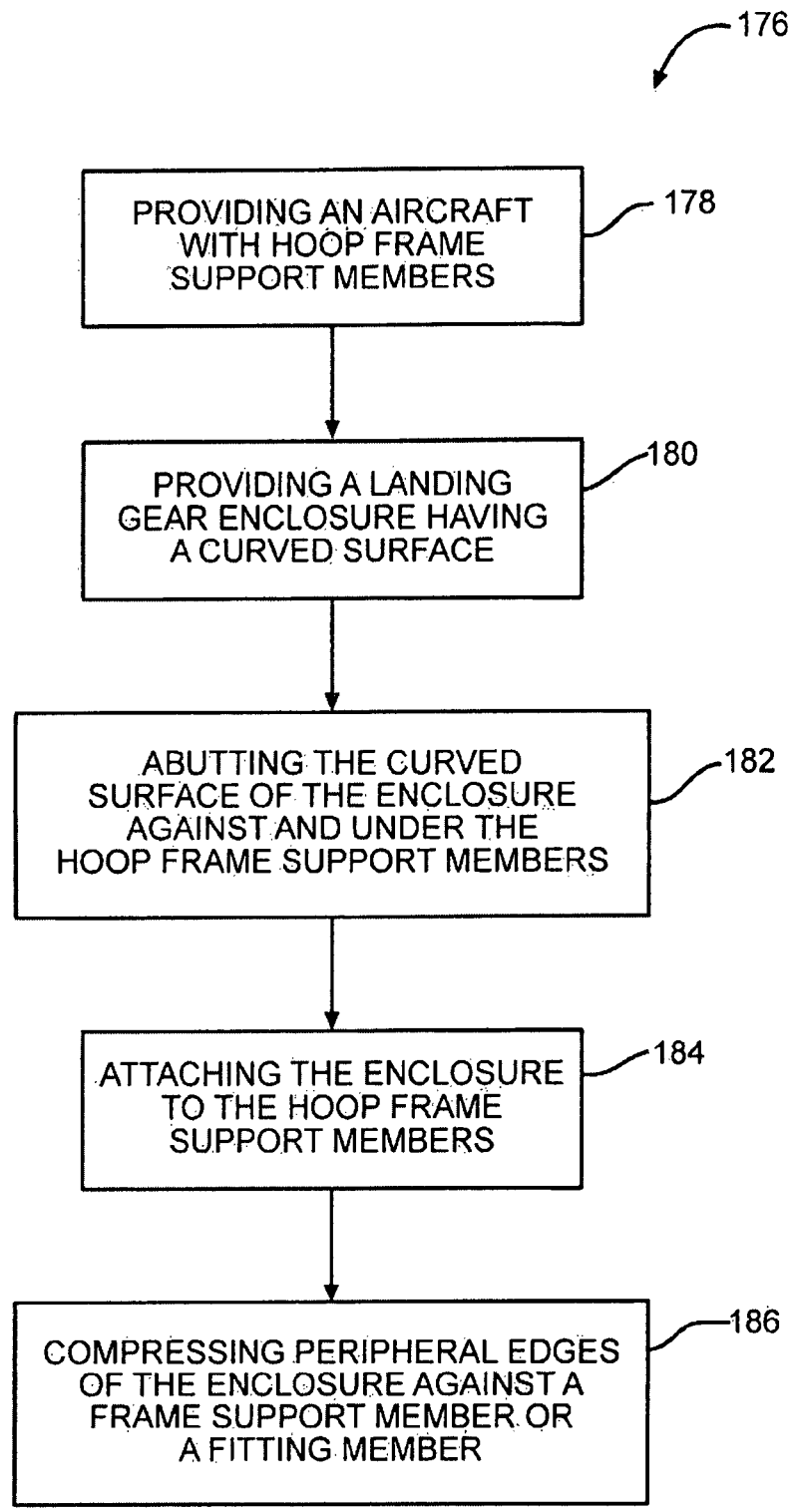
FIG. 5 shows a flowchart of one embodiment of a method of installing a landing gear enclosure in an aircraft.

FIG. 5 shows a flowchart of one embodiment of a method 176 of installing a landing gear enclosure 24 in an aircraft 10, which may be made of a composite. In one step 178, an aircraft 10 may be provided comprising a plurality of hoop frame support members 16. The hoop frame support members 16 may form continuous loops 18 around the aircraft fuselage 12 which carry all of the fuselage loads of the aircraft 10. In another step 180, a landing gear enclosure 24 may be provided comprising a curved surface 22. The landing gear enclosure 24 may be dome-shaped. In yet another step 182, the curved surface 22 of the landing gear enclosure 24 may be abutted against and under at least a portion of the plurality of hoop frame support members 16.

In another step 184, the landing gear enclosure 24 may be attached to the hoop frame support members 16. The plurality of hoop frame support members 36 may support the curved surface 22 of the landing gear enclosure 24 so that all fuselage loads of the aircraft are carried by the hoop frame support members 16 independently from the landing gear enclosure 24. In still another step 186, peripheral edges 52 and 64 of the landing gear enclosure 24 may be compressed against at least one of a surface 62 of a frame support member 58 and a surface 56 of a fitting member 50. The compressing step 186 may be caused by a pressure differential 46 on the landing gear enclosure 24.

Figure 6:
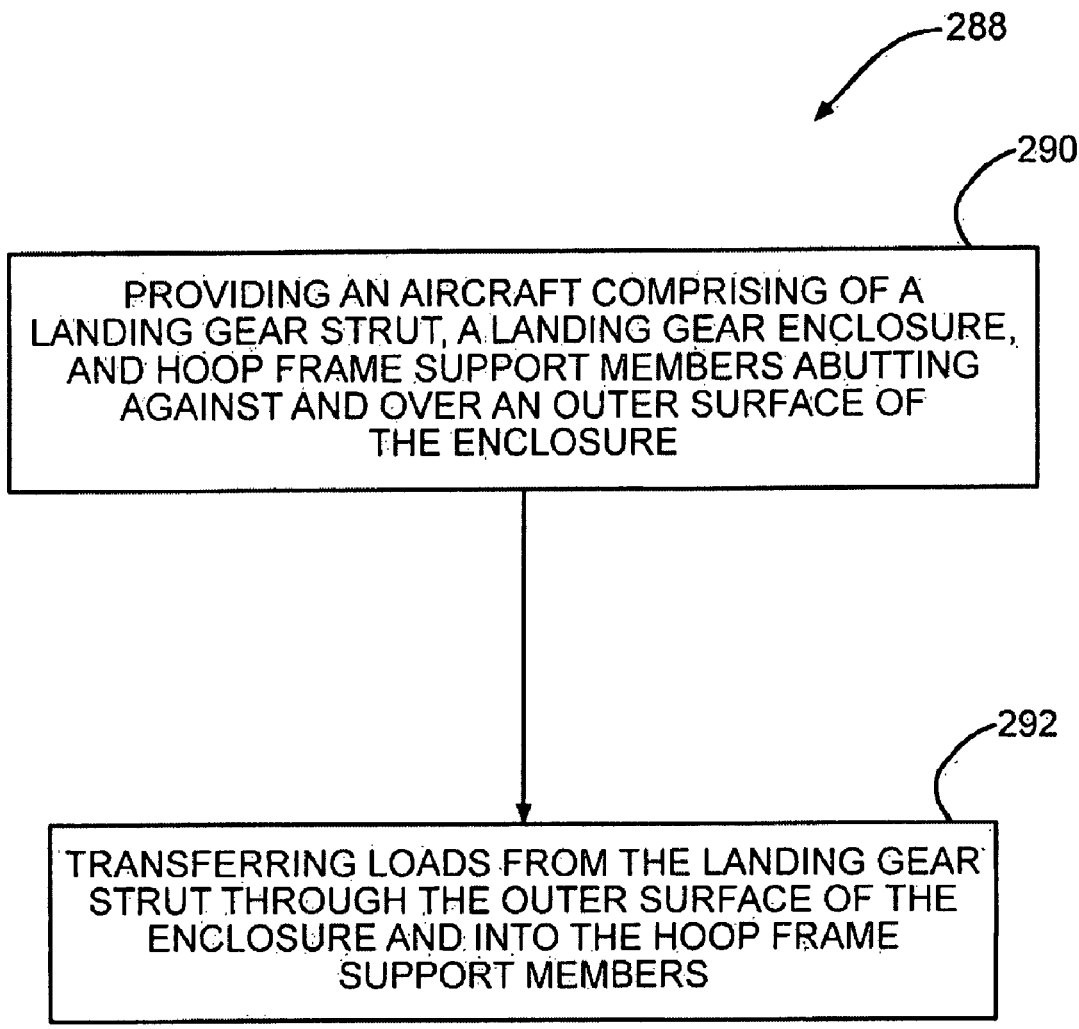
FIG. 6 shows a flowchart of one embodiment of a method of transferring loads in an aircraft.

FIG. 6 shows a flowchart of one embodiment of a method 288 of transferring loads 74 in an aircraft 10, which may be made of a composite, in one step 290, an aircraft 10 may be provided comprising a landing gear strut 66, a landing gear enclosure 24, and a plurality of hoop frame support members 16 abutting against and extending over at least one outer surface 33 of the landing gear enclosure 24. The landing gear enclosure 224 may be dome-shaped, and the outer surface 33 of the landing gear enclosure 24 may be curved. The landing gear enclosure 24 may comprise a top curved surface 22 and substantially straight side surfaces 26. The plurality of hoop frame support members 16 may form continuous loops 18 around a fuselage 12 of the aircraft 10. The continuous hoop frame support members 16 may carry ail of the fuselage loads of the aircraft 10 independently from the landing gear enclosure 24. The landing gear strut 66 may be attached to a wheel axel 67. Peripheral edges 52 and 64 of the landing gear enclosure 24 may be compressed against at least one of a surface 62 of a frame support member 58 and a surface 56 of a fitting member 50. The compression may be due to a pressure differential 46 on the landing gear enclosure 24.

The aircraft 10 may further comprise a strut fitting 70 attached to the landing gear strut 66. The landing gear strut 66 may comprise a plurality of arm members 68 which are attached to separate strut Sittings 70. The strut fittings 70 may abut against at least one inner surface 34 of the landing gear enclosure 24. In another step 292, loads 74 from the landing gear strut 66 may be transferred through the at least one outer surface 33 of the landing gear enclosure 24 and into the plurality of hoop frame support members 16. The transferring step 292 may further comprise transferring the toads 74 from the landing gear strut 66 through the strut fitting 70, through the at least one inner surface 34 of the landing gear enclosure 24, through the at least one outer surface 33 of the landing gear enclosure 24, and into the plurality of hoop frame support members 16. The loads 74 may be from landing of the aircraft 10. The at least one inner surface 34 of the landing gear enclosure 24 may comprise an inner surface of a cavity 36 of the landing gear enclosure 24.

One or more embodiments of the disclosure may reduce and/or eliminate one or more problems of one or more of the existing landing gear enclosures and/or methods of installation, use and/or load distribution. For instance, one or more embodiments of the disclosure may reduce aircraft weight, may reduce cost, may increase strength, may contain less parts, may be made more efficiently in a less complex manner, may provide improved load distribution, and/or may reduce one or more other problems of one or more of the existing landing gear enclosures and/or methods.

It should be understood, of course, that the foregoing relates to exemplary embodiments of the disclosure and that modifications may be made without departing from the spirit and scope of the disclosure as set forth in the following claims.

The invention claimed is:

1. An aircraft comprising a landing gear strut attached with a landing gear wheel, a strut fitting attached to the landing gear strut, the strut fitting abutting against an inner surface of an unpressurized landing gear enclosure, and a plurality of hoop frame support members forming loops extending within a pressurized fuselage of the aircraft, the unpressurized landing gear enclosure comprising side surfaces and a top surface extending away from the side surfaces, the plurality of hoop frame support members abutting against and extending over and around the side surfaces and the top surface of the unpressurized landing gear enclosure, wherein loads from the landing gear wheel transfer through the landing gear strut, through the strut fitting, through the inner surface of the unpressurized landing gear enclosure, through an outer surface of the unpressurized landing gear enclosure, and into the plurality of hoop frame support members, and wherein pressure differential loads, between the unpressurized landing gear enclosure and the pressurized fuselage, transfer from the unpressurized landing gear enclosure, through the inner and the outer surfaces of the unpressurized landing gear enclosure, and into the plurality of hoop frame support members.

2. The aircraft of claim 1 wherein the side surfaces of the unpressurized landing gear enclosure are substantially straight side, and the top surface of the unpressurized landing gear enclosure comprise a concave dome curved surface extending away from the substantially straight side surfaces.

3. The aircraft of claim 1 wherein the strut fitting comprises a substantially straight surface abutting against said inner surface of the unpressurized landing gear enclosure.

4. The aircraft of claim 1 wherein the landing gear strut comprises a plurality of arm members attached to separate strut fittings, the separate strut fittings abutting against the inner surface of the unpressurized landing gear enclosure.

5. The aircraft of claim 1 wherein the plurality of hoop frame support members are spaced-apart.

6. The aircraft of claim 1 wherein the unpressurized landing gear enclosure is dome-shaped.

7. The aircraft of claim 1 wherein the outer surface of the unpressurized landing gear enclosure is curved.

8. The aircraft of claim 1 wherein the loops formed by the plurality of hoop frame support members continuously extend around the pressurized fuselage and carry fuselage loads of the aircraft independently from the unpressurized landing gear enclosure.

9. The aircraft of claim 1 wherein the side surfaces of the unpressurized landing gear enclosure are substantially straight, and the top surface of the unpressurized landing gear enclosure is curved.

10. The aircraft of claim 1 wherein peripheral edges of the unpressurized landing gear enclosure are compressed against at least one of a surface of a frame support member and a surface of a fitting member.

11. The aircraft of claim 10 wherein the compression is caused by the pressure differential loads.

12. The aircraft of claim 1 wherein the aircraft is made of a composite.

13. The aircraft of claim 1 wherein the unpressurized landing gear enclosure is made of a composite.

14. The aircraft of claim 1 wherein the plurality of hoop frame support members are made of at least one of Titanium and Aluminum.

15. A method of transferring loads in an aircraft comprising:
providing an aircraft comprising a landing gear strut attached with a landing gear wheel, a strut fitting attached to the landing gear strut, the strut fitting abutting against an inner surface of an unpressurized landing gear enclosure, the unpressurized landing gear enclosure comprising side surfaces and a top surface extending away from the side surfaces, and a plurality of hoop frame support members forming loops extending within a pressurized fuselage of the aircraft, the plurality of hoop frame support members abutting against and extending over and around the side surfaces and the top surface of the unpressurized landing gear enclosure;
transferring loads from the landing gear wheel, through the landing gear strut, through the strut fitting, through the inner surface of the unpressurized landing gear enclosure, through an outer surface of the unpressurized landing gear enclosure, and into the plurality of hoop frame support members; and
transferring pressure differential loads, comprising the pressure differential between the unpressurized landing gear enclosure and the pressurized fuselage, from the unpressurized landing gear enclosure, through the inner and the outer surfaces of the unpressurized landing gear enclosure, and into the plurality of hoop frame support members.

16. The method of claim 15 wherein the side surfaces of the unpressurized landing gear enclosure are substantially straight, and the top surface of the unpressurized landing gear enclosure comprises a concave dome top curved surface extending away from the substantially straight side surfaces.

17. The method of claim 15 wherein the plurality of hoop frame support members are spaced-apart.

18. The method of claim 15 wherein the unpressurized landing gear enclosure is dome-shaped.

19. The method of claim 15 wherein the loops formed by the plurality of hoop frame support members continuously extend around the pressurized fuselage, and further comprising the plurality of hoop frame support members carrying fuselage loads of the aircraft independently from the unpressurized landing gear enclosure.

20. The method of claim 15 wherein the outer surface of the unpressurized landing gear enclosure is curved.

21. The method of claim 15 wherein the side surfaces of the unpressurized landing gear enclosure are substantially straight, and the top surface of the unpressurized landing gear enclosure is curved.

22. The method of claim 15 wherein the transfer loads from the landing gear wheel are from landing of the aircraft.

23. The method of claim 15 wherein the landing gear strut comprises a plurality of arm members attached to separate strut fittings, and the separate strut fittings abut against the inner surface of the unpressurized landing gear enclosure.

24. The method of claim 15 further comprising compressing peripheral edges of the unpressurized landing gear enclosure against at least one of a surface of a frame support member of the aircraft and a surface of a fitting member of the aircraft.

25. The method of claim 24 wherein the compression is due to the transferred pressure differential loads.

26. The method of claim 15 wherein the aircraft is made of a composite.

27. The method of claim 15 wherein the unpressurized landing gear enclosure is made of a composite.

28. The method of claim 15 wherein the plurality of hoop frame support members are made of at least one of Titanium and Aluminum.

* * * * *